UNITED STATES PATENT OFFICE.

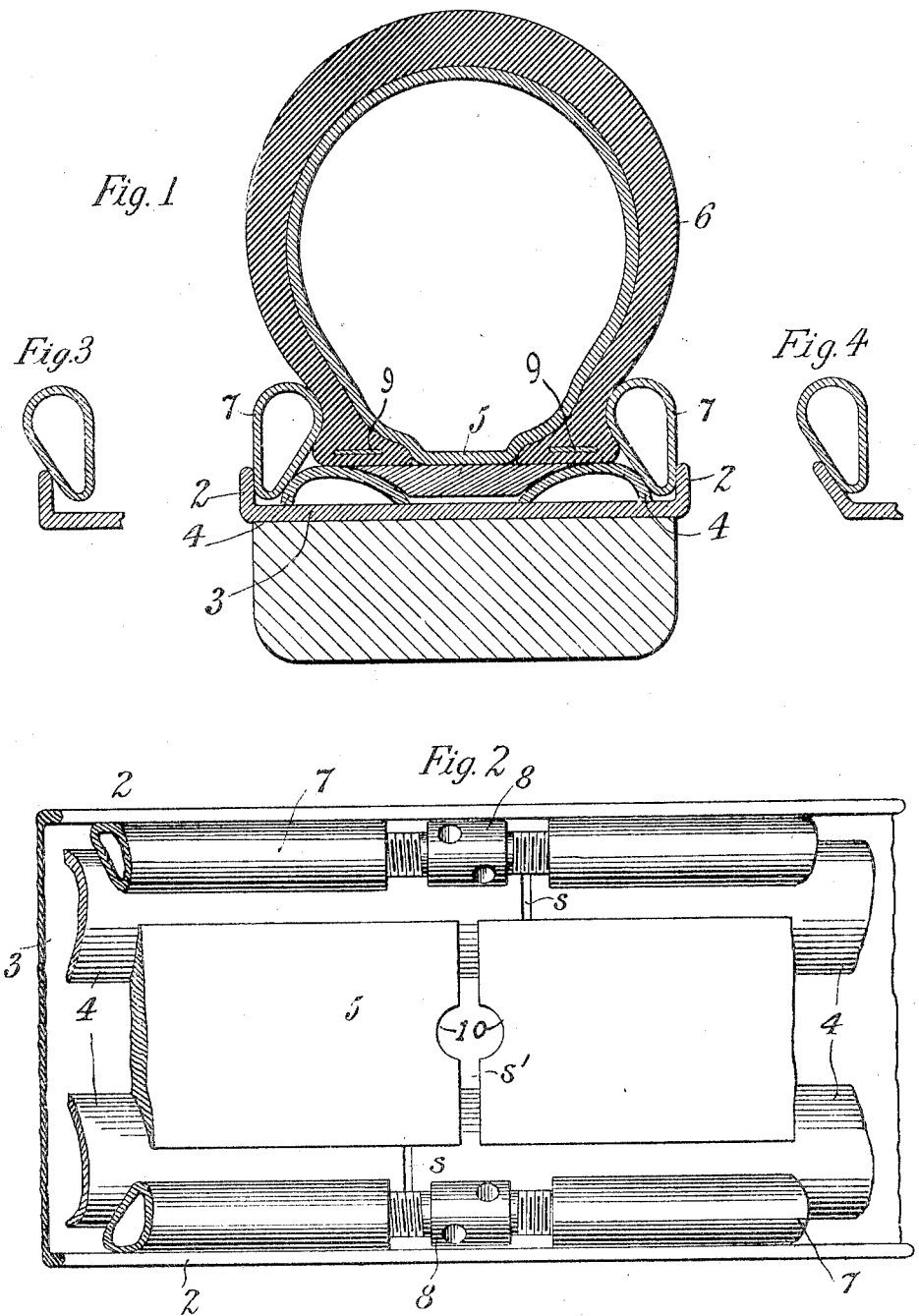

THOMAS MIDGLEY, OF COLUMBUS, OHIO.

TIRE-FASTENER.

No. 802,703.  Specification of Letters Patent.  Patented Oct. 24, 1905.

Application filed December 22, 1904. Serial No. 237,897.

*To all whom it may concern:*

Be it known that I, THOMAS MIDGLEY, a citizen of the United States, residing at Columbus, in the county of Franklin, State of Ohio, have invented certain new and useful Improvements in Tire-Fasteners, of which the following is a specification, reference being had to the drawings accompanying and forming part of the same.

My invention relates to devices for securing tires to vehicle-wheels, more particularly resilient tires of the type having a detachable jacket or cover, though it is applicable to other kinds as well.

Previously to my invention it had been proposed to secure a tire to a rim by first placing it more or less loosely on the wheel-rim and then expanding the rim against the inner surface of the tire, with the intention in this way of securing a perfect fit between the tire and rim, the considerable pressure exerted against the tire, the inner bearing surface or portions of which are preferably substantially inextensible, being utilized to hold the tire in place with great firmness, thereby avoiding any tendency to "creep" or otherwise become displaced, as not infrequently occurs in the case of tires fastened by devices which exert pressure upon the tire in the direction toward the center of the wheel.

In carrying out my invention I make use of the above-mentioned principle of exerting the retaining pressure radially outward against the inner face of the tire; but I provide novel means for this purpose by which certain disadvantages incident to the earlier devices, so far as these are known to me, are avoided. For example, in my improvement the part of the rim which bears upon the tire is expanded equally and continuously throughout its entire circumference, thereby engaging the tire with equal firmness throughout. Also the expanding devices may be located entirely on the outer face of the rim, where they are readily accessible for adjustment, &c. Furthermore, there need be no parts projecting into or through the rim inwardly or outwardly from its sides. The device is also simple in construction and economical to manufacture and possesses no delicate parts, so that the danger of breakage under even the severest conditions of use is eliminated or reduced to a minimum.

While my invention may be embodied in a great variety of forms, I shall describe specifically herein only the preferred form, shown typically in the accompanying drawings, in which—

Figure 1 is a section taken radially through the rim, and Fig. 2 is a detail plan view looking toward the center of the wheel. Figs. 3 and 4 are detail sectional views showing equivalent modifications.

At each edge of the rim is a flange 2, preferably at right angles to the periphery. I prefer to make these flanges integral with a flat ring 3, which latter is secured to the wheel in any suitable manner. Adjacent to the flanges are two beveled expanding-rings 4 4, movable laterally upon the recessed rim 3. Between the rings 4 4 is an annulus 5, which is also beveled to coöperate with the contiguous sides of the former rings and which is preferably wide enough to fit closely the space between the said rings when they are arranged against the flanges 2 2. The rings 4 4 are preferably split, as shown at $s\ s$, Fig. 1, to enable them to be readily sprung over the flanges 2 2 into position, and the annulus 5 is also split, as shown at $s'$, for the same purpose and also to permit expansion, as will appear hereinafter. It is upon this annulus that the tire 6 rests, and it is obvious that if the beveled rings 4 4 be drawn toward each other the coacting bevels on them and on the annulus will lift the latter from the rim and expand it against the tire with a degree of pressure depending upon the nearness of the tapered rings to each other. For the purpose of thus actuating the rings 4 4 various devices might be used; but I prefer a pair of tapered rings 7 7 in the spaces between the flanges 2 2 and the outer bevels of the rings 4 4. The actuating-rings 7 7 are split; but their ends are connected by screw devices 8 8, so that by turning up the latter the rings will be contracted and forced down into the triangular spaces. The flanges 2 2 being fixed, the cam-rings 4 4 must, therefore, move toward each other and expand the annulus 5 against the tire 6, as previously explained, the degree of pressure exerted upon the latter being determined by the extent of contraction of the tapered rings 7 7. The tire which I prefer to use has an inextensible base formed by one or more bands or rings 9 embedded therein, as shown, or otherwise, so that there is no stretching of the tire as the annulus expands, thereby making the pressure of the latter wholly effective in binding the tire upon the wheel-rim without dependence upon any elasticity of the tire.

Figs. 3 and 4 show equivalent constructions of the cam-rings and rim-flanges. In the former the bevel on the ring is outward, and in the latter the bevel is on the flange. The ultimate effect of these forms is of course the same as in Fig. 1.

It will be noted that as the cam-rings are brought down into place and the annulus expanded, the effective seat for the tire is narrowed by reason of the inward inclination of the ring-faces in Fig. 1, and the inward movement of the rings in Figs. 3 and 4. This narrowing of the tire-seat may be sufficient to exert an inward lateral pressure on the tire edges and so assist in holding the tire.

When the device is intended to be used with pneumatic tires, the adjacent ends of the annulus may be notched, as at 10, making an opening adapted to register with an aperture in the rim through which the tire-valve may extend.

From the foregoing it will be seen that my invention provides a device which is not only simple and inexpensive in construction, but also most efficient in operation. The pressure on the tire is exerted radially outward with perfect uniformity around the circumference and is therefore at all times in direct opposition to the weight of the vehicle at the point of contact with the roadway. Almost any degree of friction between the tire and the rim may be produced merely by tightening the rings 7 7, so that circular or lateral displacement of the tire may be made practically impossible. It will also be seen that the operative parts of the device are of such nature that they may be made as strong as desired without undue increase in weight and that none of the parts need be in any sense delicate or particularly liable to breakage.

Having now described the preferred form of my invention, what I claim is—

1. The combination with a tire, of a seat for the same having a plurality of parts adjustable toward each other in the operation of securing the tire to the wheel, and a wedging-ring adjustable in length, adapted to force the said parts of the seat toward each other for securing the tire in position, as set forth.

2. The combination, with a tire, of a seat for the same having two parts adjustable toward each other in the operation of securing the tire to the wheel, and a wedging-ring, adjustable in length, and adapted by engagement with the seat throughout its entire circumference to force the two parts together in the operation of securing the tire in place, as set forth.

3. The combination of a wheel-rim, an expansible annular bearing for a tire thereon, expanding-rings at the sides of the same, and means for actuating the expanding-rings, as set forth.

4. The combination of a wheel-rim, an expansible annular bearing for the tire on the rim, beveled expanding-rings at the sides of the same and having their beveled portions projecting thereunder, and means for forcing the expanding-rings toward each other, as set forth.

5. The combination of a wheel-rim having flanges projecting radially from the edges thereof, an expansible annular bearing for a tire on the rim, beveled expanding-rings between the flanges and the bearing and having their beveled portions projecting under the bearing, and means intermediate the flanges and expanding-rings for forcing the said rings toward each other, as set forth.

6. The combination of a wheel-rim having flanges projecting radially from the edges thereof, an expansible annular bearing for a tire on the rim, beveled expanding-rings between the flanges and the bearing and having their beveled portions projecting under the bearing, tapered actuating-rings having their tapered portions extending between the flanges and the expanding-rings, and means for contracting the actuating-rings, as set forth.

7. The combination of a wheel-rim having flanges projecting radially from the edges thereof, an expansible annular bearing for a tire, having its inner edges beveled, expanding-rings at the sides of the annular bearing, each expanding-ring having its outer edges beveled and each having one of its beveled edges projecting under the adjacent beveled inner edges of the bearing, tapered actuating-rings engaging the flanges and the adjacent beveled edges of the expanding-rings, and means for contracting the actuating-rings, as set forth.

THOMAS MIDGLEY.

Witnesses:
THOMAS J. BYRNES,
S. S. DUNHAM